United States Patent
Cheng et al.

(10) Patent No.: US 10,397,458 B2
(45) Date of Patent: Aug. 27, 2019

(54) TELECENTRIC ILLUMINATION AND PHOTOGRAPHING SYSTEM FOR DETECTION OF MARINE MICROSCOPIC ORGANISMS

(71) Applicant: Graduate School at Shenzhen, Tsinghua University, Shenzhen, Guangdong (CN)

(72) Inventors: Xuemin Cheng, Guangdong (CN); Hongsheng Bi, Guangdong (CN); Yonghong He, Guangdong (CN); Zhonghua Cai, Guangdong (CN); Jiayong Lin, Guangdong (CN)

(73) Assignee: GRADUATE SCHOOL AT SHENZHEN, TSINGHUA UNIVERSITY, Shenzhen, Guangdong (CN)

( * ) Notice: Subject to any disclaimer, the term of this patent is extended or adjusted under 35 U.S.C. 154(b) by 74 days.

(21) Appl. No.: 15/783,748

(22) Filed: Oct. 13, 2017

(65) Prior Publication Data
US 2018/0041675 A1 Feb. 8, 2018

Related U.S. Application Data

(63) Continuation of application No. PCT/CN2016/077702, filed on Mar. 29, 2016.

(30) Foreign Application Priority Data

Feb. 29, 2016 (CN) .......................... 2016 1 0109858

(51) Int. Cl.
*H04N 5/225* (2006.01)
*F21K 9/61* (2016.01)
(Continued)

(52) U.S. Cl.
CPC ............ *H04N 5/2256* (2013.01); *F21K 9/61* (2016.08); *F21V 9/14* (2013.01); *G02B 6/0001* (2013.01);
(Continued)

(58) Field of Classification Search
CPC .. H04N 5/2256; H05B 33/0845; H05B 33/08; G02B 6/0001; G02B 13/22; F21K 9/61; F21V 9/14; F21Y 2115/10
See application file for complete search history.

(56) References Cited

U.S. PATENT DOCUMENTS 4,853,736 A * 8/1989 Goto .................... G03G 15/169
399/296
6,091,983 A * 7/2000 Alfano ................. A61B 5/4312
250/341.3
(Continued)

FOREIGN PATENT DOCUMENTS

CN 1121998 A 5/1996
CN 101051179 A 10/2007
(Continued)

OTHER PUBLICATIONS

International Search Report (English and Chinese) and Written Opinion issued in PCT/CN2016/077702 dated Nov. 7, 2016.
(Continued)

*Primary Examiner* — Luong T Nguyen
(74) *Attorney, Agent, or Firm* — Hamre, Schumann, Mueller & Larson, P.C.

(57) ABSTRACT

A telecentric illumination and photographing system for detection of marine microscopic organisms includes an optical path module and an illumination drive module, where the optical path module includes: an LED light source, a light homogenizing rod, a decoherence light homogenizing sheet, a diaphragm, a telecentric collimation
(Continued)

camera, where a light beam emitted from the diaphragm is incident into a microscopic organism area with uniform illuminance after passing through the telecentric collimation camera; and a telecentric imaging camera, matching the telecentric collimation camera to receive an illumination beam passing through the microscopic organism area and output the illumination beam to an imaging unit, to obtain an imaging result of uniform illuminance. Further, the illumination drive module enables the LED light source to work in a stable state in which light emitting intensity is constant, thereby improving current output accuracy.

12 Claims, 4 Drawing Sheets

(51) Int. Cl.
  *F21V 9/14* (2006.01)
  *H05B 33/08* (2006.01)
  *F21Y 115/10* (2016.01)
  *F21V 8/00* (2006.01)
  *G02B 13/22* (2006.01)
(52) U.S. Cl.
  CPC ......... *G02B 13/22* (2013.01); *H05B 33/0845* (2013.01); *F21Y 2115/10* (2016.08)

(56) References Cited

U.S. PATENT DOCUMENTS

| 2001/0051377 | A1* | 12/2001 | Hammer | G01N 35/00029 |
| | | | | 436/43 |
| 2007/0195025 | A1 | 8/2007 | Korcharz et al. | |
| 2009/0284968 | A1* | 11/2009 | Kuo | F21V 7/005 |
| | | | | 362/235 |
| 2010/0097802 | A1* | 4/2010 | Jurik | G02B 27/0994 |
| | | | | 362/235 |
| 2011/0058388 | A1 | 3/2011 | Cassarly et al. | |
| 2011/0268453 | A1* | 11/2011 | Fest | F41G 7/001 |
| | | | | 398/129 |
| 2017/0097558 | A1* | 4/2017 | Belkin | G02F 1/3556 |
| 2017/0108686 | A1* | 4/2017 | Chan | G02B 21/244 |

FOREIGN PATENT DOCUMENTS

| CN | 101174093 A | | 5/2008 |
| CN | 101644674 A | | 2/2010 |
| CN | 102147233 A | | 8/2011 |
| CN | 103134479 A | | 6/2013 |
| CN | 103234632 A | | 8/2013 |
| CN | 103389159 A | | 11/2013 |
| CN | 103412543 | | 11/2013 |
| CN | 204831214 U | | 12/2015 |
| JP | 2016-008816 | * | 1/2016 |
| JP | 2016-8816 | | 1/2016 |
| WO | 9701113 A | | 1/1997 |

OTHER PUBLICATIONS

Du et al., "Design of Optical Zoom System for Deep-Sea Detection", Laser & Optoelectronices Progress, 2013, with English translation of the abstract; 7 pages.

Kenichiro Tanaka et al., "Descattering of transmissive observation using Parallel High-Frequency Illumination", Computational Photography (ICCP), IEEE International Conference on, IEEE, pp. 1-8.

Liu Junying et at, "The Stability Analysis and Improvement of SPIDNN Control System", Automation and Logistics, 2009. ICAL '09. IEEE International Conference on, Aug. 1, 2009, pp. 992-996.

* cited by examiner

TELECENTRIC ILLUMINATION AND PHOTOGRAPHING SYSTEM FOR DETECTION OF MARINE MICROSCOPIC ORGANISMS

CROSS REFERENCE TO RELATED APPLICATIONS

This application is a continuation application of PCT/CN2016/077702, filed on Mar. 29, 2016. The contents of PCT/CN2016/077702 are all hereby incorporated by reference.

BACKGROUND

Technical Field

The present application relates to an illumination and imaging technology, and in particular, to a telecentric illumination and photographing system for detection of marine microscopic organisms, providing illumination to detection of marine microscopic organisms.

Related Arts

With the development of scientific researches, it is found that data such as existence and growth of microscopic organisms in water system environments such as oceans, lakes, and rivers, ingredients of metabolins, and water-soluble gas ingredients all closely and accurately reflects a condition of a local environment and is closely linked with a living environment of people. However, there are quite a lot of technical problems for technical means of researching microscopic organisms because sizes and dimensions of microscopic organisms are mostly at the micrometer scale, especially in a relatively turbid water body and in a water body of a sludge mixture.

When imaging microscopic organisms, a general illumination light source and a photographing camera have problems such as scattering, light interference, and non-uniform imaging illuminance, causing many adverse effects on observation of the microscopic organisms. For example, scattering results in vague imaging and low contrast, coherent stripes are formed and an alternation of bright and dark areas of a part of an image surface is caused due to light interference, and non-uniform imaging illuminance affects overall observation of imaging.

In addition, a high-power light emitting diode (LED) system for illumination also needs a better drive, and available drives mainly include three types, that is, a current-limiting resistor, a linear voltage regulator, and a switching converter. A current-limiting resistor solution is applicable to an application scenario with low efficiency and has an extremely high requirement for efficiency. Therefore, the method is not used for an illumination drive requiring high image acquisition accuracy. The linear regulator is only applicable to a scenario of a low current or a scenario in which a forward voltage drop of an LED is slightly lower than a power supply voltage, but also has problems of low efficiency and a small input voltage range. A switching-type synchronous-buck drive has characteristics of flexible circuit topology, high efficiency, and a broad input voltage range, and has high current sampling accuracy. After factors such as working efficiency, an installation size, a static current, a working voltage, noise, and output regulation are comprehensively considered, currently, most of drive circuits of image illumination detection devices use switching converters. A topology structure of a switching converter includes a buck manner, a boost manner, a buck-boost manner, and the like. However, such a switching converter cannot well resolve the following five problems and a problem that lighting effects of an LED attenuate due to long-time working:

(1) A buck-boost function. When an input voltage or a voltage drop of an LED fluctuates, an output voltage is regulated, to satisfy a requirement that an output current is constant and ensure that the LED stably and reliably emits light.

(2) High power conversion efficiency. A circuit drive loss is lowered, energy consumption is reduced, a quantity of times of charging a storage battery is reduced, and a service life of a battery is prolonged.

(3) A brightness regulation function. When an exposure time of an imaging system needs to be regulated, a current may be regulated by using a pulse width modulation (PWM) signal.

(4) There is a complete protection circuit. Various protection measures need to be taken to ensure reliable working of the protection circuit and the LED. The protection measures are, for example, low-voltage latching, over-voltage protection, overheat protection, and output open-circuit or short-circuit protection.

(5) A good heat dissipation function. Because of thermal properties of the LED, a temperature is one of important factors that affect stable working of the LED. When working at night, the LED is in a state of being lit up for a long time. Therefore, a good heat dissipation function is necessary, to ensure a service life and reliable working of the LED.

SUMMARY

A main objective of the present application is to provide a telecentric illumination and photographing system for detection of marine microscopic organisms, to make imaging illuminance be highly uniform and improve imaging quality, thereby overcoming disadvantages in the prior art.

A further objective of the present application is to provide illumination drive with a large current and high reliability for detection of marine planktons.

To achieve the foregoing objectives, the following technical solutions are used in the present application:

A telecentric illumination and photographing system for detection of marine microscopic organisms includes an optical path module and an illumination drive module, where the optical path module includes:

an LED light source, configured to provide an illumination light source;

a light homogenizing rod, configured to mix light beams emitted from the LED light source to obtain uniform light intensity distribution;

a decoherence light homogenizing sheet, configured to perform secondary light homogenization on the light beams emitted from an end surface of the light homogenizing rod and perform decoherence processing on the light beams, to obtain an incoherent and uniform light source surface;

a diaphragm, configured to determine a corresponding diaphragm aperture according to a requirement for a collimation degree of an illumination beam;

a telecentric collimation camera, where a light beam emitted from the diaphragm is incident into a microscopic organism area with uniform illuminance after passing through the telecentric collimation camera; and a telecentric imaging camera, matching the telecentric collimation camera and configured to cooperate with the telecentric collimation camera to receive an illumination beam passing through the microscopic organism area and output the illumination beam to an imaging unit, to obtain an imaging result of uniform illuminance.

Further, a light spectrum range of the LED light source is from near-ultraviolet 365 nm to an infrared band and may be a light spectrum area of a band of therein, for example, 420 nm to 680 nm, or a light spectrum of a single narrowband, for example, red light 635±50 nm.

Further, the light homogenizing rod may be a square or conical internal reflection cavity or may be a transparent optical material entity.

Further, a light emitting diameter D of the LED light source and a length L of the light homogenizing rod satisfy the following relationship: L≥D*3.

Preferably, a light emitting surface of the LED light source is a rectangle, and the corresponding light emitting diameter D is a diagonal length of the rectangle.

Further, a scattering mode of the decoherence light homogenizing sheet is lambertian, and a scattering rate≥0.5.

Further, a numerical aperture NA of the telecentric collimation camera≥0.5.

Further, the telecentric collimation camera has a telecentric degree less than or equal to 2 degrees and is set to satisfy illumination and observation for microscopic organisms of a size of as small as 50 micrometers.

Further, the optical path module further includes:

a polarizer, disposed between the telecentric collimation camera and the microscopic organism area and configured to polarize a light beam emitted from the telecentric collimation camera to eliminate a scattering phenomenon of the light beam; and an analyzer, disposed between the microscopic organism area and the telecentric imaging camera, where the analyzer is disposed by cooperating with the polarizer and is configured to eliminate stray light generated when microscopic organisms are illuminated.

Preferably, a transmission-extinction ratio Ts/Tp of the polarizer>50:1, where Ts is a transmission rate of S-polarized light, and Tp is a transmission rate of P-polarized light; and a transmission-extinction ratio Ts/Tp of the analyzer>50:1, where Ts is a transmission rate of S-polarized light, and Tp is a transmission rate of P-polarized light.

Further, the illumination drive module includes:

a PWM synchronization signal unit, configured to provide a PWM synchronization signal of an imaging system;

a processing unit, configured to receive the PWM synchronization signal and generate a digital signal after performing quantization processing on the PWM synchronization signal;

a digital-to-analog conversion unit, configured to receive the digital signal and output an analog voltage signal after performing digital-to-analog conversion on the digital signal;

an analog signal amplification unit, configured to receive the analog voltage signal and output an analog quantization voltage after performing synchronous following and amplification on the analog voltage signal, where the LED light source is driven by the analog quantization voltage; and a synchronous current detection unit, configured to perform real-time sampling on a working current of the LED light source and transmit sampled current information to the processing unit, where the processing unit performs feedback control according to the sampled current information, so that the LED light source works in a stable state in which light emitting intensity is constant.

Further, the processing unit performs light intensity or light brightness attenuation compensation by using a single-output proportional-integral-derivative neural network (SPIDNN) and according to the sampled current information, the SPIDNN includes an input layer, a hidden layer, and an output layer, the input layer has two proportional neurons, the hidden layer has one proportional neuron, one integral neuron, and one derivative neuron, the output layer has one proportional neuron, one proportional neuron of the input layer inputs a preset ideal working current Ref_I, and the other proportional neuron of the input layer inputs a sampled actual working current Real_I, the SPIDNN outputs a control signal Out_pwm with a pulse width after processing, and a drive signal of the LED light source is based on the control signal Out_pwm.

Further, a network weight of the SPIDNN is automatically adjusted by making a formula (3.1) reach the minimum:

$$E = \frac{[\text{Ref\_I}(k) - \text{Real\_I}(k)]^2}{2} \quad (3.1)$$

where E is an error evaluation function, Ref_I(k) is a value of an ideal working current at a moment k, and Real_I(k) is a value of an actual working current at the moment k.

Beneficial effects of the present application are:

In the present application, a highly uniform decoherence illumination light source is obtained in a manner of combining a light homogenizing rod and a decoherence homogenizing sheet and by combining a telecentric collimation camera and a telecentric imaging camera, so that illuminance of an imaging surface is extremely uniform.

Further, in the present application, the illumination drive module performs real-time sampling on a working current of the LED light source and transmits sampled current information to the processing unit, and the processing unit performs feedback control according to the sampled current information, so that the LED light source works in a stable state in which light emitting intensity is constant. Therefore, current output accuracy is improved, a current can be controlled to reach output accuracy of 0.1 mA, and reliability is high. The present application can achieve a gain function of automatically regulating a current along with a lighting effect attenuation curve of the LED light source, greatly prolonging a service life of an LED array module.

In conclusion, the present application can provide an illumination drive system with a large current and high reliability for detection of marine planktons.

DETAILED DESCRIPTION

Embodiments of the present application are described in detail below. It should be emphasized that the following descriptions are merely exemplary and are not intended to limit the scope and application of the present invention.

Figure 1:
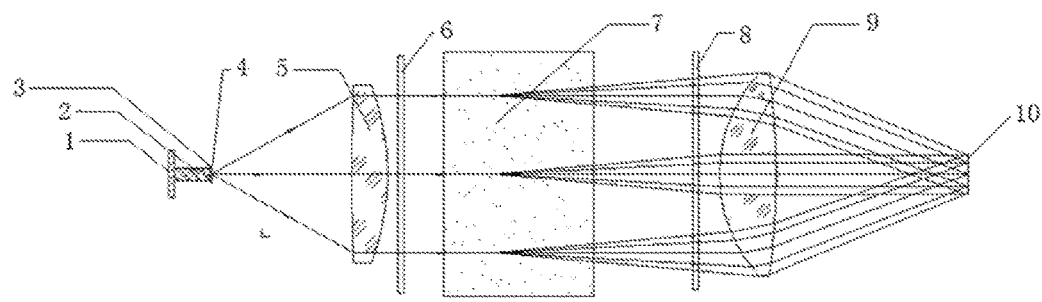
FIG. 1 is a schematic structural diagram of an optical path module according to an embodiment of the present application.

Referring to FIG. 1, in an embodiment, a telecentric illumination and photographing system for detection of marine microscopic organisms includes an optical path module and an illumination drive module. The optical path module includes an LED light source 1, a light homogenizing rod 2, a decoherence light homogenizing sheet 3, a diaphragm 4, a telecentric collimation camera 5, and a telecentric imaging camera 9. The LED light source 1 provides an illumination light source. The light homogenizing rod 2 mixes light beams emitted from the LED light source 1 to obtain uniform light intensity distribution. The decoherence light homogenizing sheet 3 performs secondary light homogenization on a light beam emitted from an end surface of the light homogenizing rod 2 and performs decoherence processing on the light beam, to obtain an incoherent and uniform light source surface. The diaphragm 4 determines a corresponding aperture of the diaphragm 4 according to a requirement for a collimation degree of an illumination beam. A light beam emitted by the telecentric collimation camera 5 from the diaphragm 4 is incident into a microscopic organism area 7 with uniform illuminance after passing through the telecentric collimation camera 5. The illumination beam passes through a water body of the microscopic organism area 7, illuminates a microscopic organism environment, and provides an optimal imaging light source to the telecentric imaging camera 9. The telecentric imaging camera 9 matches the telecentric collimation camera 5, and the telecentric imaging camera 9 cooperates with the telecentric collimation camera 5 to receive the illumination beam passing through the microscopic organism area and outputs the illumination beam to an imaging unit 10, to obtain an imaging result of uniform illuminance.

In some embodiments, a light spectrum range of the LED light source 1 may be from near-ultraviolet 365 nm to an infrared band, and specifically, may be a light spectrum area of a band of therein, for example, 420 nm to 680 nm, or a light spectrum of a single narrowband, for example, red light 635±50 nm. The light spectrum range of the LED light source 1 adapts to observation of different types of microscopic organisms or other related objects.

Figure 2A:
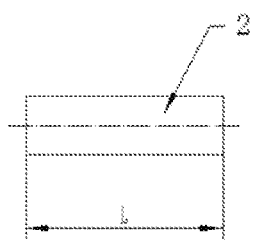
FIG. 2A and FIG. 2B are schematic structural diagrams of a light homogenizing rod according to an embodiment of the present application.
Figure 2B:
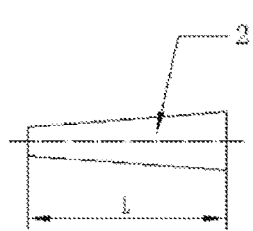

As shown in FIG. 2A and FIG. 2B, in some embodiments, the light homogenizing rod 2 may be a square or conical internal reflection cavity or may be a transparent optical material entity.

Figure 3:
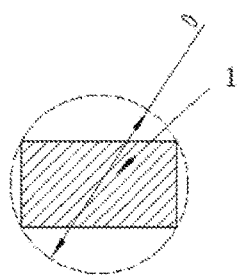
FIG. 3 is a schematic diagram of a light emitting surface of an LED light source according to an embodiment of the present application.

In a preferred embodiment, a light emitting diameter D of the LED light source 1 and a length L of the light homogenizing rod 2 satisfy the following relationship: L≥D*3. As shown in FIG. 3, in a specific embodiment, a light emitting surface of the LED light source 1 is a rectangle, and the corresponding light emitting diameter D is a diagonal length of the rectangle.

In a preferred embodiment, a scattering mode of the decoherence light homogenizing sheet 3 is lambertian, and a scattering rate≥0.5.

In a preferred embodiment, an NA of the telecentric collimation camera 5≥0.5. The telecentric collimation camera 5 uses an optical telecentric structure to ensure uniform illuminance of a light beam emitted from the telecentric collimation camera 5 being incident into all imaging point areas of the microscopic organism area.

In a preferred embodiment, the telecentric collimation camera 5 has a telecentric degree less than or equal to 2 degrees and is set to satisfy illumination and observation for microscopic organisms of a size of as small as 50 micrometers.

As shown in FIG. 1, in a further embodiment, the optical path module of the telecentric illumination and photographing system further includes a polarizer 6 and an analyzer 8. The polarizer 6 is disposed between the telecentric collimation camera 5 and the microscopic organism area and is configured to polarize a light beam emitted from the telecentric collimation camera 5 to eliminate a scattering phenomenon of the light beam, to obtain an imaging effect with higher contrast. The analyzer 8 is disposed between the microscopic organism area and the telecentric imaging camera 9, and the analyzer 8 is disposed by cooperating with the polarizer 6 and is configured to eliminate stray light generated when microscopic organisms are illuminated, so that the telecentric imaging camera 9 can obtain clearer imaging effects.

In a more preferred embodiment, a transmission-extinction ratio Ts/Tp of the polarizer 6>50:1, where Ts is a transmission rate of S-polarized light, and Tp is a transmission rate of P-polarized light; and a transmission-extinction ratio Ts/Tp of the analyzer 8>50:1, where Ts is a transmission rate of S-polarized light, and Tp is a transmission rate of P-polarized light.

Figure 4:
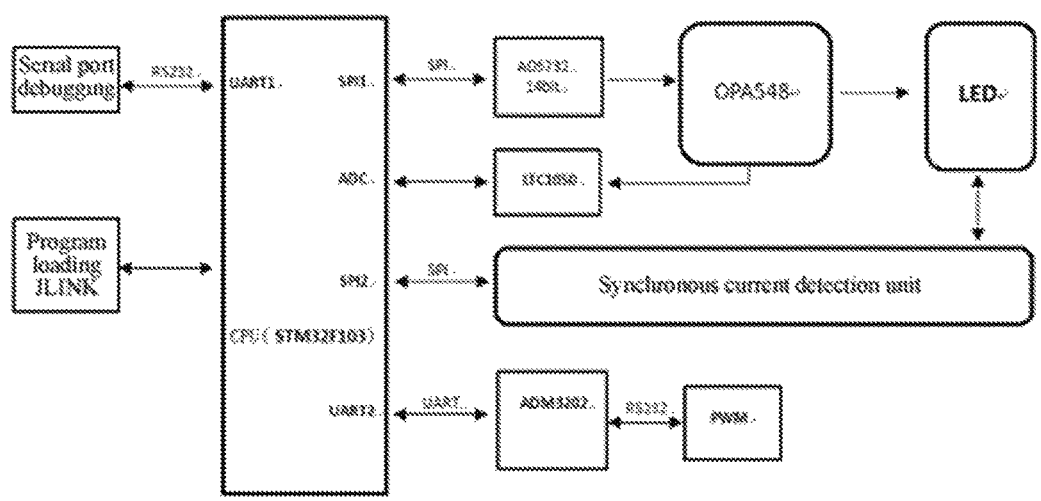
FIG. 4 is a circuit block diagram of an illumination drive module according to an embodiment of the present application.

Referring to FIG. 4, in some embodiments, the illumination drive module of the telecentric illumination and photographing system includes a PWM synchronization signal unit, a processing unit, a digital-to-analog conversion unit, an analog signal amplification unit, and a synchronous current detection unit. The PWM synchronization signal unit provides a PWM synchronization signal of an imaging system. The processing unit receives the PWM synchronization signal and generates a digital signal after performing quantization processing on the PWM synchronization signal. The digital-to-analog conversion unit receives the digital signal and outputs an analog voltage signal after performing digital-to-analog conversion on the digital signal. The analog signal amplification unit receives the analog voltage signal and outputs an analog quantization voltage after performing synchronous following and amplification on the analog voltage signal. The LED light source 1 is driven by the analog quantization voltage. The synchronous current detection unit performs real-time sampling on a working current of the LED light source 1 and transmits sampled current information to the processing unit. The processing unit performs feedback control according to the sampled current information, so that the LED light source 1 works in a stable state in which light emitting intensity is constant.

Further, the PWM synchronization signal unit may provide a PWM signal of a synchronous imaging system, and a PWM pulse width ratio thereof is adjustable, effectively prolonging electric endurance of a microscopic organism detection system. The processing unit may perform control processing by using a CPU. The digital-to-analog conversion unit may implement accurate control over currents by using a digital-to-analog conversion chip with 14-bit accuracy.

As shown in FIG. 4, when the system runs, the CPU (STM32F103) receives, by using a level shift chip (ADM3202), a PWM synchronization signal provided by the PWM synchronization signal unit (PWM). The CPU performs quantization processing on the input PWM signal and transmits a calculation result to the digital-to-analog conversion chip (AD5732) with as high as 14-bit accuracy by using an SPI digital interface for analog voltage output. A rear-end high-voltage large-current operational amplifier (OPA548) performs synchronization circuit following output on an input voltage analog quantity, and an analog quantization voltage drives the LED. In addition, the synchronous current detection unit performs real-time sampling on the working current of the LED. The sampled current information is transmitted to the CPU, and the CPU performs output according to the sampled information, thereby implementing current control of high accuracy.

To accurately perform light intensity or light brightness attenuation compensation, a photodetector may be added to detect a magnitude of light brightness and perform current compensation according to the light brightness.

According to the system, stable working of the LED and constant lighting effects can be ensured, so that LED light emitting brightness does not have a light intensity or light brightness attenuation phenomenon after long-time working, and a gain function of automatically regulating a current along with an LED lighting effect attenuation curve can be achieved, thereby greatly prolonging a service life of an LED array module.

Figure 5:
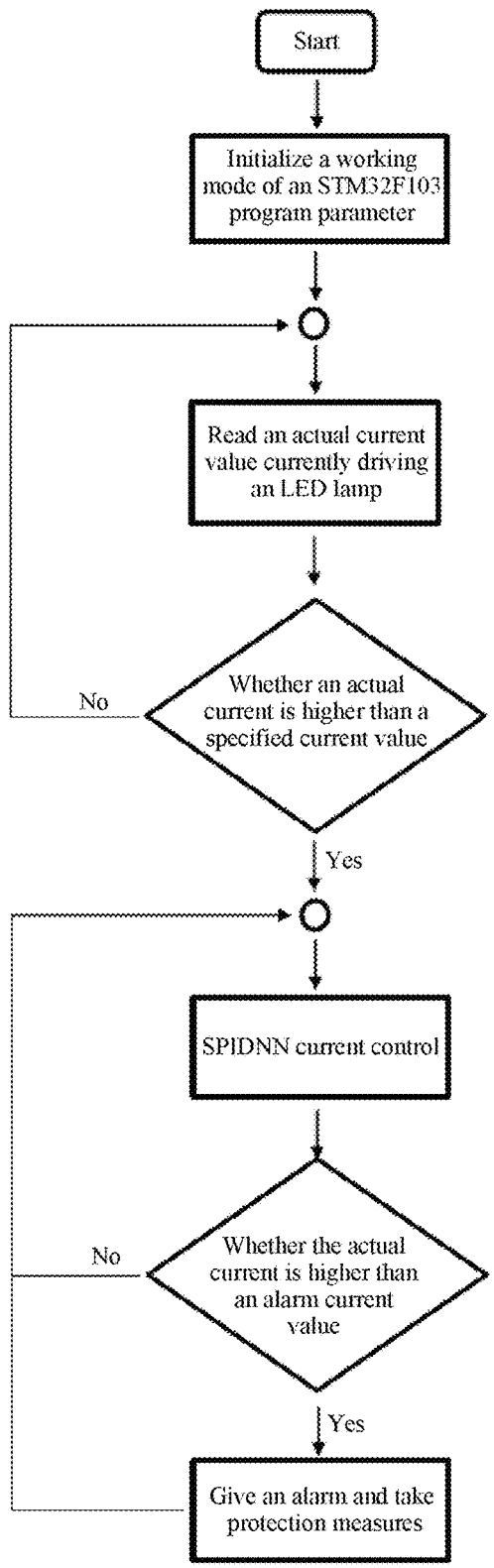
FIG. 5 is a control flowchart according to an embodiment of the present application.

A control procedure of running of the system is shown in FIG. 5. When the system works, the synchronous current detection unit performs real-time sampling on the working current of the LED. The CPU reads an actual current value of a currently driven LED, determines whether the current value is higher than a specified value, and performs current control if the current value is higher than the specified value, to ensure stable working of the LED. After performing current control, the CPU further determines whether the actual current value is higher than a predetermined alarm value, and gives an alarm and takes protection measures if the actual current value is higher than the predetermined alarm value.

Figure 6:
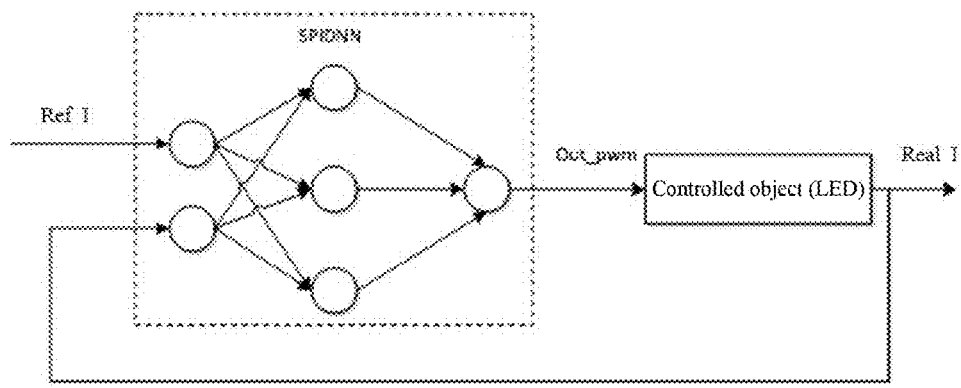
FIG. 6 is a structural diagram of a current automatic control system according to an embodiment of the present application.
Figure 7:
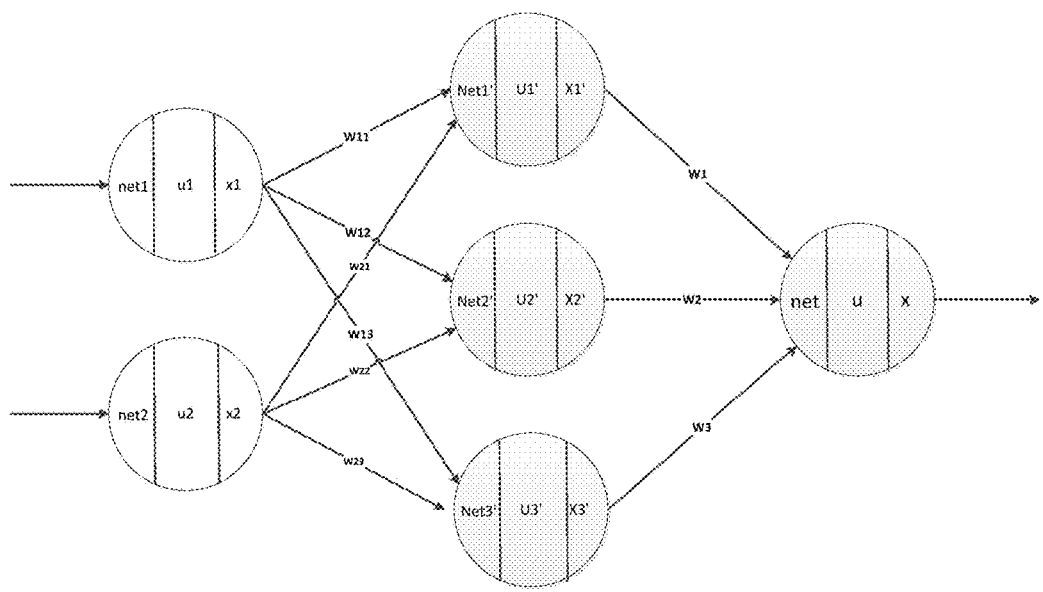
FIG. 7 is a structural diagram of an SPIDNN according to an embodiment of the present application.

As shown in FIG. 6 and FIG. 7, in a preferred embodiment, the system establishes an SPIDNN to perform current control. The processing unit performs light intensity or light brightness attenuation compensation by using the SPIDNN and according to the sampled current information. The SPIDNN includes an input layer, a hidden layer, and an output layer. The input layer has two proportional neurons. The hidden layer has one proportional neuron, one integral neuron, and one derivative neuron. The output layer has one proportional neuron. One proportional neuron of the input layer inputs a preset ideal working current Ref_I, and the other proportional neuron of the input layer inputs a sampled actual working current Real_I. The SPIDNN outputs a control signal Out_pwm with a pulse width after processing. A drive signal of the LED light source is based on the control signal Out_pwm.

Information sampled by the synchronous current detection unit is transmitted to the CPU to perform SPIDNN algorithm control, and the CPU performs attenuation compensation by using a current control PID algorithm, to ensure consistency of light emitting intensity of the LED. The system may control current accuracy to be within a range of 0.1 mA.

The structure of a current automatic control system using the SPIDNN is shown in FIG. 6. Ref_I represents the most appropriate working current of a device, Real_I represents an actual working current of the device, and Out_pwm represents an output pulse width (that is, a duty cycle of a pulse) of a single chip microcomputer obtained by processing by the SPIDNN.

The structure of the SPIDNN is shown in FIG. 7. The SPIDNN has five neurons. The input layer includes two proportional neurons. The hidden layer includes one proportional neuron, one integral neuron, and one derivative neuron. The output layer includes one proportional neuron. Connections between the neurons and corresponding connection weights are shown in FIG. 7. A forward algorithm of the SPIDNN is used. Initial values of the connection weights in the SPIDNN are as follows:

$$W_{1j}=+1, W_{2j}=-1, W_1=K_P, W_2=k_I, W_3=k_D,$$

where $k_P$ is a proportional connection weight, $k_I$ is an integral connection weight, $k_D$ is a derivative connection weight, and values thereof should ensure that the system is initially stable.

In FIG. 7, symbols from left to right in each circle sequentially represent an input value, a calculation value, and an output value.

It is first specified as follows:

$$r(k)=\text{Ref\_I}(k), y(k)=\text{Real\_I}(k), v(k)=\text{Out\_pwm}(k).$$

net1 and net2 are respectively an input value and a feedback value of an neuron on the input layer. u1 and u2 are respectively calculation values. x1 and x2 are output values of the neuron on the input layer. At a moment k, relationships between them are as follows:

$$\begin{cases} u1(k) = net1(k) = r(k) \\ u2(k) = net2(k) = y(k) \end{cases} ; \text{and}$$

$$xi = \begin{cases} 1, & xi > 1 \\ xi, & -1 \leq xi \leq 1, (i = 1, 2) \\ -1, & xi < -1 \end{cases}.$$

Correspondingly, calculation manners of symbols of the three neurons on the hidden layer are as follows:

$$Net'_j(k) = \sum_{i=1}^{2} w_{ij} xi(k), \ j = 1, 2, 3;$$

$$\begin{cases} U1'(k) = Net1'(k) \\ U2'(k) = U2'(k-1) + Net2'(k) \\ U3'(k) = Net3'(k) - Net3'(k-1) \end{cases} ; \text{and}$$

$$xi' = \begin{cases} 1, & xi' > 1 \\ xi', & -1 \leq xi' \leq 1, (i = 1, 2, 3), \\ -1, & xi' < -1 \end{cases}$$

where U1', U2', and U3' respectively represent calculation values of the proportional neuron, the integral neuron, and the derivative neuron.

A method for calculating symbols on the output layer is as follows:

$$u(k) = net(k) = \sum_{i=1}^{3} w_i xi'(k); \text{ and}$$

-continued $$x(k) = \begin{cases} 1, x(k) > 1 \\ x, -1 \leq x(k) \leq 1 \\ -1, x(k) < -1 \end{cases}$$

Finally, total output of the network is as follows:

$y(k)=x(k)$.

To achieve learning and memory functions of the SPI-DNN and enable an actual current of the device to more rapidly and more stably approach an optimal working current thereof, the system completes automatic regulation of a network weight of the SPIDNN by using an error back propagation learning algorithm. Making a formula (3.1) be the minimum is a criterion and a goal for training and learning, thereby implementing automatic regulation of the network weight:

$$E = \frac{[\text{Ref\_I}(k) - \text{Real\_I}(k)]^2}{2} \quad (3.1)$$

where E is an error evaluation function, Ref_I(k) is a value of an ideal working current at a moment k, and Real_I(k) is a value of an actual working current at the moment k.

An iterative formula of weights from the hidden layer to the output layer is as follows:

$Wj(n+1)=Wj(n)-\eta j*\partial E/\partial Wj, j=1,2,3$ (3.2)

where Wj(n) is a weight from the hidden layer to the output layer after learning for n steps, and $\eta_j$ is a weight between learning steps.

Upon calculation, $\partial E/\partial Wj = -\Sigma_{k=1}^{t}[r(k)-y(k)]\text{sgn}([y(k)-y(k-1)]/[v(k)-v(k-1)])Xj(k)$, where r(k)=Ref_I(k), y(k)=Real_I(k), v(k)=Out_pwm(k), v(k) is Out_pwm(k) and is a linear superposition value of a proportion, an integer, and a derivative for an offset, and $$v(k) = k_p e(k) + k_I \sum_{k=1}^{n} e(k) + k_D(e(k) - e(k-1)).$$

An iterative formula of weights from the input layer to the hidden layer is as follows:

$Wij(n+1)=Wij(n)-\eta i*\partial E/\partial Wij, j=1,2,3; i=1,2$ (3.3)

where $W_{ij}(n)$ is a weight from the input layer to the hidden layer after learning for n steps, and $\eta_i$ is a weight between learning steps.

Upon calculation, $\partial E/\partial Wij = -\delta(k)Wj\text{sgn}([Uj'(k)-Uj'(k-1)]/[netj'(k)-netj'(k-1)])Xi(k)$, where $\delta(k)=2[r(k)-y(k)]\text{sgn}([y(k)-y(k-1)]/[v(k)-v(k-1)])$.

$\eta$ in the formula (3.2) and the formula (3.3) is a learning step length. To ensure an SPIDNN control system to converge in a learning process, a value of $\eta$ should satisfy:

$$0 < \eta_j < 1/\varepsilon_j^2 \text{ and } 0 < \eta_i < 1/\varepsilon_i^2 \quad (3.4)$$

where $$\varepsilon_j = -\frac{\delta(k)X_j'(k)}{|r(k)-y(k)|};$$

$$\varepsilon_i = -\frac{\sigma_j(k)X_i(k)}{|r(k)-y(k)|}; \text{ and}$$

$$\frac{\partial E}{\partial Wj} = -X_j(k)[r(k)-y(k)]\text{sgn}\frac{y(k)-y(k-1)}{v(k)-v(k-1)}.$$

In a specific embodiment, an internal structure of an LED light source matrix uses a parallel physical package form. A working voltage of an LED light source module is approximately 2.6 V. A light source drive system performs synchronous buck large-current control by using a working voltage adapting to the LED light source module. The light source drive system preferably introduces low-voltage latching, over-voltage protection, overheat protection, and output open-circuit or short-circuit protection. Even if the drive system abnormally works, other system modules are not invalid or damaged.

Although the present application is described above in further detail through specific/preferred embodiments, the present application is not limited to the specific embodiments. A person of ordinary skill in the art may make several replacements or modifications to these described embodiments without departing from the idea of the present application, and these replacements or modifications all should be considered as falling within the protection scope of the present application.

What is claimed is:

1. A telecentric illumination and photographing system for detection of marine microscopic organisms, comprising an optical path module and an illumination drive module, wherein the optical path module comprises:
 a light emitting diode (LED) light source, configured to provide an illumination light source;
 a light homogenizing rod, configured to mix light beams emitted from the LED light source to obtain uniform light intensity distribution;
 a decoherence light homogenizing sheet, configured to perform secondary light homogenization on the light beams emitted from an end surface of the light homogenizing rod and perform decoherence processing on the light beams, to obtain an incoherent and uniform light source surface;
 a diaphragm, configured to determine a corresponding diaphragm aperture according to a requirement for a collimation degree of an illumination beam;
 a telecentric collimation camera, wherein a light beam emitted from the diaphragm is incident into a microscopic organism area with uniform illuminance after passing through the telecentric collimation camera; and
 a telecentric imaging camera, matching the telecentric collimation camera and configured to cooperate with the telecentric collimation camera to receive an illumination beam passing through the microscopic organism area and output the illumination beam to an imager, to obtain an imaging result of uniform illuminance;
wherein the illumination drive module comprises:
 a pulse width modulation (PWM) synchronizer, configured to provide a PWM synchronization signal of an imaging system;

a processor, configured to receive the PWM synchronization signal and generate a digital signal after performing quantization processing on the PWM synchronization signal;
a digital-to-analog converter, configured to receive the digital signal and output an analog voltage signal after performing digital-to-analog conversion on the digital signal;
an analog signal amplifier, configured to receive the analog voltage signal and output an analog quantization voltage after performing synchronous following and amplification on the analog voltage signal, wherein the LED light source is driven by the analog quantization voltage; and
a synchronous current detector, configured to perform real-time sampling on a working current of the LED light source and transmit sampled current information to the processor, wherein the processor performs feedback control according to the sampled current information, so that the LED light source works in a stable state in which light emitting intensity is constant;
wherein the processor performs light intensity or light brightness attenuation compensation by using a single-output proportional-integral-derivative neural network (SPIDNN) and according to the sampled current information, the SPIDNN comprises an input layer, a hidden layer, and an output layer, the input layer has two proportional neurons, the hidden layer has one proportional neuron, one integral neuron, and one derivative neuron, the output layer has one proportional neuron, one proportional neuron of the input layer inputs a preset ideal working current Ref_I, and the other proportional neuron of the input layer inputs a sampled actual working current Real_I, the SPIDNN outputs a control signal Out_pwm with a pulse width after processing, and a drive signal of the LED light source is based on the control signal Out_pwm.

2. The telecentric illumination and photographing system for detection of marine microscopic organisms according to claim 1, wherein a light spectrum range of the LED light source is from near-ultraviolet 365 nm to an infrared band.

3. The telecentric illumination and photographing system for detection of marine microscopic organisms according to claim 1, wherein the light homogenizing rod is a square or conical internal reflection cavity.

4. The telecentric illumination and photographing system for detection of marine microscopic organisms according to claim 1, wherein the light homogenizing rod is a transparent optical material entity.

5. The telecentric illumination and photographing system for detection of marine microscopic organisms according to claim 1, wherein a light emitting diameter D of the LED light source and a length L of the light homogenizing rod satisfy the following relationship: L ≥3×D.

6. The telecentric illumination and photographing system for detection of marine microscopic organisms according to claim 5, wherein a light emitting surface of the LED light source is a rectangle, and a corresponding light emitting diameter D is a diagonal length of the rectangle.

7. The telecentric illumination and photographing system for detection of marine microscopic organisms according to claim 1, wherein a scattering mode of the decoherence light homogenizing sheet is lambertian, and a scattering rate ≥0.5.

8. The telecentric illumination and photographing system for detection of marine microscopic organisms according to claim 1, wherein a numerical aperture (NA) of the telecentric collimation camera ≥0.5.

9. The telecentric illumination and photographing system for detection of marine microscopic organisms according to claim 1, wherein the telecentric collimation camera has a telecentric degree less than or equal to 2 degrees and is set to satisfy illumination and observation for microscopic organisms of a size of as small as 50 micrometers.

10. The telecentric illumination and photographing system for detection of marine microscopic organisms according to claim 1, wherein the optical path module further comprises:
a polarizer, disposed between the telecentric collimation camera and the microscopic organism area and configured to polarize a light beam emitted from the telecentric collimation camera to eliminate a scattering phenomenon of the light beam; and
an analyzer, disposed between the microscopic organism area and the telecentric imaging camera, wherein the analyzer is disposed by cooperating with the polarizer and is configured to eliminate stray light generated when microscopic organisms are illuminated.

11. The telecentric illumination and photographing system for detection of marine microscopic organisms according to claim 10, wherein a transmission-extinction ratio Ts/Tp of the polarizer >50:1, wherein Ts is a transmission rate of S-polarized light, and Tp is a transmission rate of P-polarized light; and a transmission-extinction ratio Ts/Tp of the analyzer>50:1, wherein Ts is a transmission rate of S-polarized light, and Tp is a transmission rate of P-polarized light.

12. The telecentric illumination and photographing system for detection of marine microscopic organisms according to claim 1, wherein a network weight of the SPIDNN is automatically adjusted by making a formula (3.1) reach the minimum:

$$E = \frac{[\text{Ref\_I}(k) - \text{Real\_I}(k)]^2}{2} \quad (3.1)$$

wherein E is an error evaluation function, Ref_I(k) is a value of an ideal working current at a moment k, and Real_I(k) is a value of an actual working current at the moment k.

* * * * *